United States Patent
Phagoo et al.

(10) Patent No.: US 7,879,229 B2
(45) Date of Patent: Feb. 1, 2011

(54) WATER TREATMENT PLANT WITH IMMERSED MEMBRANES

(75) Inventors: Deonarine Phagoo, Toronto (CA); Douglas Joseph Thompson, Hamilton (CA); Jeffrey Peter Penny, Grimsby (CA); Jake Goldstein, Toronto (CA); Jason A. Diamond, Burlington (CA)

(73) Assignee: Zenon Technology Partnership, Wilmington, DE (US)

( * ) Notice: Subject to any disclaimer, the term of this patent is extended or adjusted under 35 U.S.C. 154(b) by 505 days.

(21) Appl. No.: 10/974,886

(22) Filed: Oct. 28, 2004

(65) Prior Publication Data

US 2005/0126963 A1     Jun. 16, 2005

Related U.S. Application Data

(60) Provisional application No. 60/514,910, filed on Oct. 29, 2003.

(51) Int. Cl.
 *B01D 61/22* (2006.01)
 *C02F 3/22* (2006.01)
 *C02F 11/12* (2006.01)

(52) U.S. Cl. ............... 210/109; 210/195.1; 210/195.3; 210/253; 210/257.2; 210/321.69; 210/137

(58) Field of Classification Search ............ 210/97, 210/134, 194, 195.1, 151, 253, 255, 257.2, 210/333.01, 321.69, 321.79, 341, 109, 195.3, 210/137
See application file for complete search history.

(56) References Cited

U.S. PATENT DOCUMENTS

| | | | | |
|---|---|---|---|---|
| 1,766,166 A | * | 6/1930 | Callow | 210/425 |
| 2,766,203 A | * | 10/1956 | Brown et al. | 210/706 |
| 3,228,524 A | * | 1/1966 | Richards | 210/138 |
| 4,125,463 A | | 11/1978 | Chenoweth | |
| 4,749,494 A | | 6/1988 | Tomoyasu et al. | |
| 5,084,220 A | | 1/1992 | Moller | |
| 5,248,424 A | | 9/1993 | Cote et al. | |
| 5,254,253 A | * | 10/1993 | Behmann | 210/607 |
| 5,403,479 A | | 4/1995 | Smith et al. | |
| 5,607,593 A | | 3/1997 | Cote et al. | |
| 5,620,605 A | | 4/1997 | Moller | |

(Continued)

FOREIGN PATENT DOCUMENTS

CA     2218889     10/1996

(Continued)

OTHER PUBLICATIONS

Excerpts from bid documents for The Traverse City WWTP, Mar. 2002.

(Continued)

*Primary Examiner*—Terry K Cecil
(74) *Attorney, Agent, or Firm*—Bereskin & Parr LLP/S.E.N.C.R.L.,s.r.l.

(57) ABSTRACT

A liquid treatment plant has sets of membrane trains and processing trains with flow between them through channels. Flow configurations for withdrawing permeate and sludge from the trains are described. Cyclic aeration is provided to the membrane trains. Methods of foam control, backwashing and chemical cleaning are described. Single membrane trains or process trains may be isolated for various functions. An isolated membrane train may be used to thicken sludge.

5 Claims, 6 Drawing Sheets

U.S. PATENT DOCUMENTS

| | | | |
|---|---|---|---|
| 5,639,373 A | 6/1997 | Mahendran et al. | |
| 5,643,455 A | 7/1997 | Kopp et al. | |
| 5,656,173 A * | 8/1997 | Jordan et al. | 210/703 |
| 5,783,083 A | 7/1998 | Henshaw et al. | |
| 5,958,240 A * | 9/1999 | Hoel | 210/608 |
| 6,045,698 A | 4/2000 | Cote et al. | |
| 6,174,437 B1 * | 1/2001 | Haney | 210/257.2 |
| 6,214,231 B1 | 4/2001 | Cote et al. | |
| 6,245,239 B1 * | 6/2001 | Cote et al. | 210/636 |
| 6,331,251 B1 | 12/2001 | Del Vecchio et al. | |
| 6,488,851 B1 * | 12/2002 | Almog | 210/605 |
| 6,550,747 B2 * | 4/2003 | Rabie et al. | 261/23.1 |
| 6,627,082 B2 | 9/2003 | Del Vecchio et al. | |
| 6,858,140 B2 * | 2/2005 | Smith et al. | 210/332 |

FOREIGN PATENT DOCUMENTS

| | | |
|---|---|---|
| CA | 2279766 | 1/2001 |
| JP | 02-095497 | 4/1990 |
| JP | 03-077699 | 4/1991 |
| JP | 03-101815 | 4/1991 |
| JP | 03-249999 | 11/1991 |
| JP | 06-114400 | 4/1994 |
| JP | 06-179000 | 6/1994 |
| JP | 10-028999 | 2/1998 |
| JP | 10-290984 | 11/1998 |
| JP | 11-165200 | 6/1999 |
| JP | 2001-170670 | 6/2001 |

OTHER PUBLICATIONS

English language machine translation of JP2001-170670, (Jun. 26, 2001).

* cited by examiner

WATER TREATMENT PLANT WITH IMMERSED MEMBRANES

This is an application claiming the benefit under 35 USC 119(e) of U.S. Provisional Application Ser. No. 60/514,910, filed Oct. 29, 2003. Application Ser. No. 60/514,910 is incorporated herein, in its entirety, by this reference to it.

FIELD OF THE INVENTION

This invention relates to an apparatus and process for treating water, for example filtering water or treating wastewater, in a plant having immersed membranes.

BACKGROUND OF THE INVENTION

Immersed membranes are a class of filtering membranes. The membranes may have pores in the microfiltration or ultrafiltration range. Individual membranes may be assembled into modules that provide a port or fitting for making connections, for example to withdraw permeate, to one or more membranes. The modules may be assembled into cassettes. The cassette may provide a frame to hold several modules together at a desired spacing or orientation between them. The frame may also support one or more headers or manifolds, for example a permeate manifold for connecting a permeate port for each module to a common permeate port for the cassette. The cassettes may be immersed in tanks filled with water to be treated at ambient pressure and connected to a source of suction for withdrawing permeate through the membrane walls. In large plants, one or more cassettes may be grouped together into larger production units that may be called trains. Multiple trains of cassettes may be located in a set of distinct tanks. The arrangement of the cassettes, trains and other components of the plant, the configuration of pipe, valve and pump networks for permeation and other functions, and the process steps for operating the plant can each have significant effects on the overall efficiency of the plant, its tolerance of equipment failures or its sense of operation.

U.S. Pat. No. 6,214,231, issued Apr. 10, 2001 to Cote et al., described a plant in which plural cassettes are grouped together for operation in parallel. One or more of the cassettes may be isolated while permeate production from the remaining cassettes is uninterrupted. Ancillary functions such as backpulsing, chemical cleaning and integrity testing may proceed in the isolated cassette or cassettes while permeation continues with the other cassettes. U.S. Pat. No. 6,214,231 is incorporated herein in its entirety by this reference to it.

SUMMARY OF THE INVENTION

The present invention provides an apparatus and process for treating water, for example wastewater or water intended for drinking or industrial processes. The apparatus includes multiple cassettes of filtering membranes immersed in one or more tanks containing water at ambient pressure. The process involves applying suction to these membranes to withdraw permeate and may also involve various ancillary functions. The following description is intended to introduce the reader to the invention, which may reside in a combination or subcombination of features or steps described below or in other parts of this document.

In one aspect, the invention provides a treatment plant having two or more trains of cassettes, which may be called membrane trains, separation trains or filtration trains. Trains may be located in separate tanks, which may be separate portions of a larger tank. The tanks are each joined to a common inlet channel and a common outlet channel. Individual tanks may be hydraulically isolated from the inlet and outlet channels, for example to perform an ancillary function such as cleaning or tank draining.

In another aspect, the invention provides a treatment plant having two or more hydraulically distinct processing trains in distinct processing tanks, which may be portions of a larger tank. For example, in a wastewater treatment plant, each processing train may have an anoxic reactor connected in series with an aerobic reactor although other sequences of reactors may also be used. The processing tanks are each joined to a common inlet channel and a common outlet channel. In an embodiment, the outlet channel for the processing tanks is also the inlet channel for the membrane tanks. In another embodiment, the outlet channel for the processing tanks is distinct from, but hydraulically connected to, the inlet channel for the membrane tanks. The connection may be made through a pump, such as a recirculation pump, and the water level in the outlet channel for the processing tanks may be lower than the water level in the inlet channel for the membrane tanks. The outlet channel for the membrane tanks may be connected to the inlet channel of the processing tanks with flow by gravity or by recirculation pump. Sets of parallel recirculation pumps, one of which may be a spare, may be used in place of a single recirculation pump.

In another aspect, the invention provides two or more membrane tanks. Each tank having a set of cassettes and is connected to one or more outlet channels that may be a common outlet channel. The connections between the tanks are made through a weir associated with each membrane tank. The weirs are set at a common elevation so as to maintain a generally common level of water around each membrane train. Aerators for the membrane trains may be connected to a common air supply manifold.

In another aspect, the invention provides means or processes for collecting foam from the water surface of a plant. Foam sumps are provided in communication with volumes of water with foam through an opening in the foam sump. The opening may be a weir or gate that permits the foam to flow into the foam sump while not allowing excessive amounts of liquid into the foam sump. For volumes of water with variable water levels, the opening may be a variable height gate connected to a water level sensor so that the height of the gate varies in response to the height of the liquid surrounding the foam sump. To reduce the number of foam sumps required, a foam sump may be placed in an outlet channel, for example the outlet channel for the processing trains. Further, connections between upstream and downstream volumes of water may be made through gates or weirs that permit foam to pass. Alternately, a connection between volumes in series may be closed from time to time to cause foam to overflow a partition between adjacent volumes. Foam may also be made to flow between adjacent volumes in different trains by lowering a gate or weir between the volumes from time to time or by causing foam to overflow a partition between the volumes. Flow of foam between volumes, particularly adjacent volumes in parallel tanks, may be enhanced by temporarily stopping aeration in the volume intended to receive foam.

In another aspect, the invention provides a connection for multiple membrane trains or sets of cassettes to a common source of suction for permeation. The cassettes of each train have their permeate ports connected to a common train header. The train headers are in turn connected to a common plant permeate pipe. The plant permeate pipe is connected to a plurality of parallel permeate pumps. One or more of the permeate pumps may be a spare. Isolation valves may be provided between sets of cassettes and the permeate plant pipe. The rate of production of permeate may be controlled by turning one or more of the pumps on or off or isolating or connecting sets of cassettes, for example, by closing a valve in a train header. Connections for backwashing with permeate, or chemical cleaning by backwashing with a cleaning chemical, may be similarly made.

In another aspect, the invention provides for permeation and backwashing to multiple sets of cassettes. The one or more cassettes in each set have their permeate ports connected to a reversible pump which is in turn connected to a pipe common to all of the sets. The pipe is connected to a permeate tank. The permeate pump or other controls maintain a sufficient volume of water in the permeate tank at a pressure above the static head in the common pipe such that the common pipe is always flooded. By choosing the direction of a reversible pump, a set of cassettes may be backwashed while the other sets of cassettes are permeating. Permeate for the backwash is drawn from the common pipe or permeate tank. The volume of the common pipe may be taken into account to reduce the size of, or eliminate, the permeate tank.

In another aspect, aerators are provided for each cassette. The aerators for a cassette are grouped into two groups, each group being connected to a common aerator fitting such that each cassette has two aerator fittings. A pair of air supply manifolds are provided to a set of cassettes and the aerator fittings for each cassette are connected, each fitting to one of the air supply manifolds. The pair of manifolds are connected through a valve set to a supply of air. The valve set is operated to provide a flow of air that cycles between the manifolds. Multiple sets of cassettes may be connected in this way to a common pipe leading to a supply of air. The supply of air may comprise a plurality of blowers, each connected in parallel to the common pipe, one of which may be a spare.

In another aspect, a plurality of membrane trains may be arranged in a plurality of distinct membrane tanks. Each distinct tank may be connected through an isolation valve to a common tank drain pipe or channel. The common tank drain pipe or channel is connected to one or more tank drain pumps, which may be a set of parallel drain pumps. The tank drain pump or pumps may be connected to pipes or valves to allow drained water, mixed liquor or sludge to be sent to one or more of the processing trains, to a sludge thickener or digester, or to one or more of the filtration trains.

In another aspect, the invention provides a plurality of filtration trains arranged in distinct and isolatable tanks. On a continuous or intermittent basis, such as during a period of low flow, one or more of the trains may be operated as a sludge thickener. Outlets from the sludge thickening train are closed for a period of time while the sludge thickening train is operated in a dead end mode. In the dead end mode, the sludge thickening train withdraws permeate from mixed liquor from upstream processing trains or sludge or mixed liquor recirculated or drained from other filtration trains. After or as the level of water in the tank holding the thickening train drops, more water is provided either in batches or continuously until the concentration of solids in the sludge thickening train is increased. The thickened sludge is then discharged and the sludge thickening train either returned to regular service or used to thicken more sludge. The sludge thickening train may also thicken sludge in a continuous process.

One or more of these aspects may be combined with each other or with one or more features or steps described below.

BRIEF DESCRIPTION OF THE DRAWINGS

Various embodiments of the invention will now be described with reference to the following figures.

DETAILED DESCRIPTION OF THE INVENTION

Figure 1:
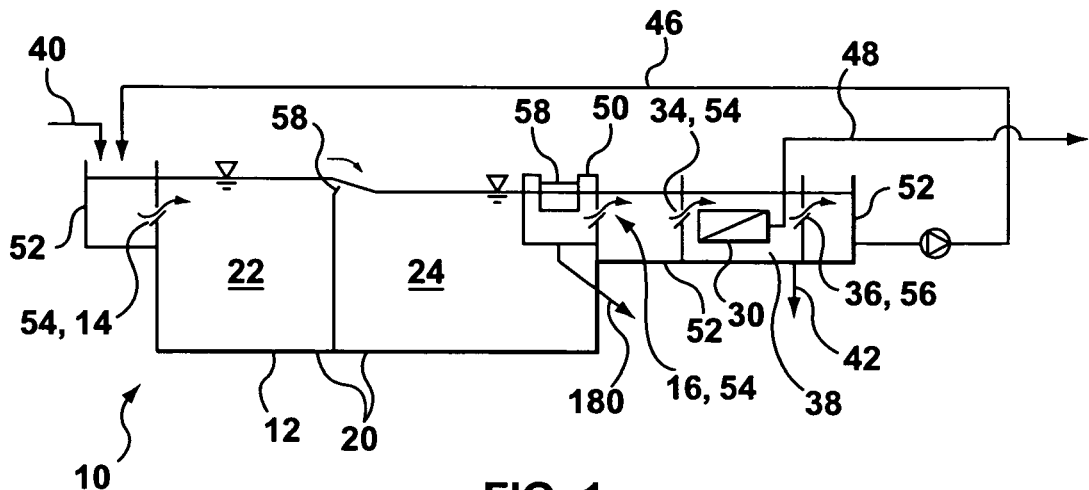
FIG. 1 is a schematic representation, in elevation view, of a treatment plant.

FIGS. 1 to 6 show three embodiments of water treatment plants 10. The treatment plants 10 are intended for treating wastewater, but aspects of their design may also be used in other plants, for example filtration plants for producing water intended for drinking, industrial processes or groundwater recharge. The treatment plants 10 have a plurality of processing trains 12, each occupying a processing tank 20 having a processing tank inlet 14 and processing tank outlet 16. Processing tank partitions 18 separate the processing trains 12 between the processing tank inlets 14 and outlets 16 so as that they occupy separate processing tanks 20, which may be portions of a larger tank. The processing tanks 20 include anoxic zones 22 and aerobic zones 24, although other types or sequences of zones may be provided. The treatment plants 10 also include a plurality of membrane trains 30 in membrane tanks 38 separated from each other by membrane tank partitions 32 between membrane tank inlets 34 and membrane tank outlets 36. In this way, the membrane trains 30 occupy distinct membrane train tanks 38. In the embodiments illustrated each membrane tank 38 is a portion of a larger tank and a single membrane train 30 occupies each membrane tank 38. However, a membrane tank 38 may also hold two or more membrane trains 30. Multiple membrane trains 30 in a membrane tank 38 may have independent pipes, valves or other equipment for one or more of permeation, backwashing, maintenance cleaning or aeration. Alternately, multiple membrane trains 30 in a membrane tank 38 may have the pipes, valves or other equipment for these functions linked together such that the multiple membrane trains 30 operate as a larger composite membrane train 30.

Figure 5:
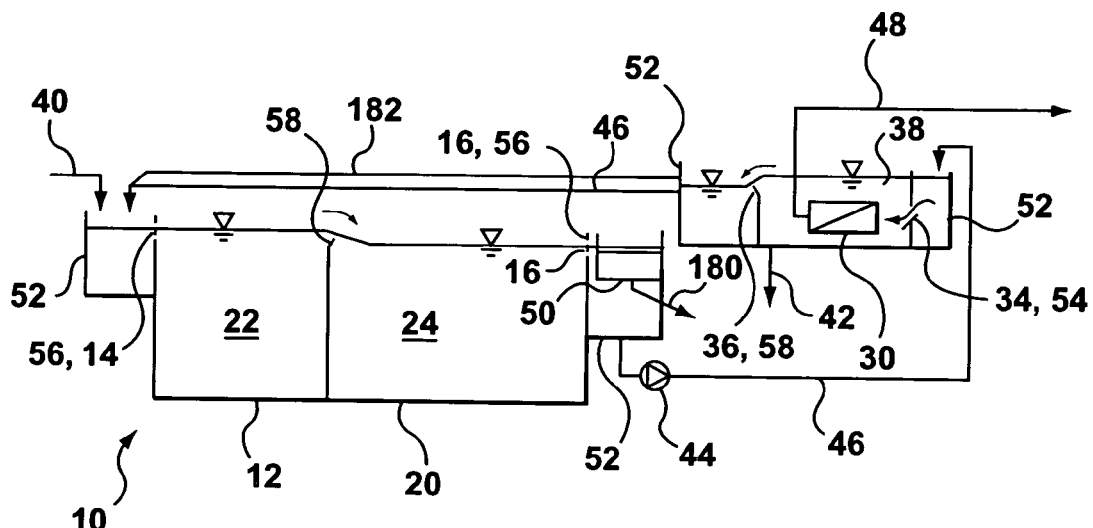
FIG. 5 is an elevation view schematic of another treatment plant.
Figure 6:
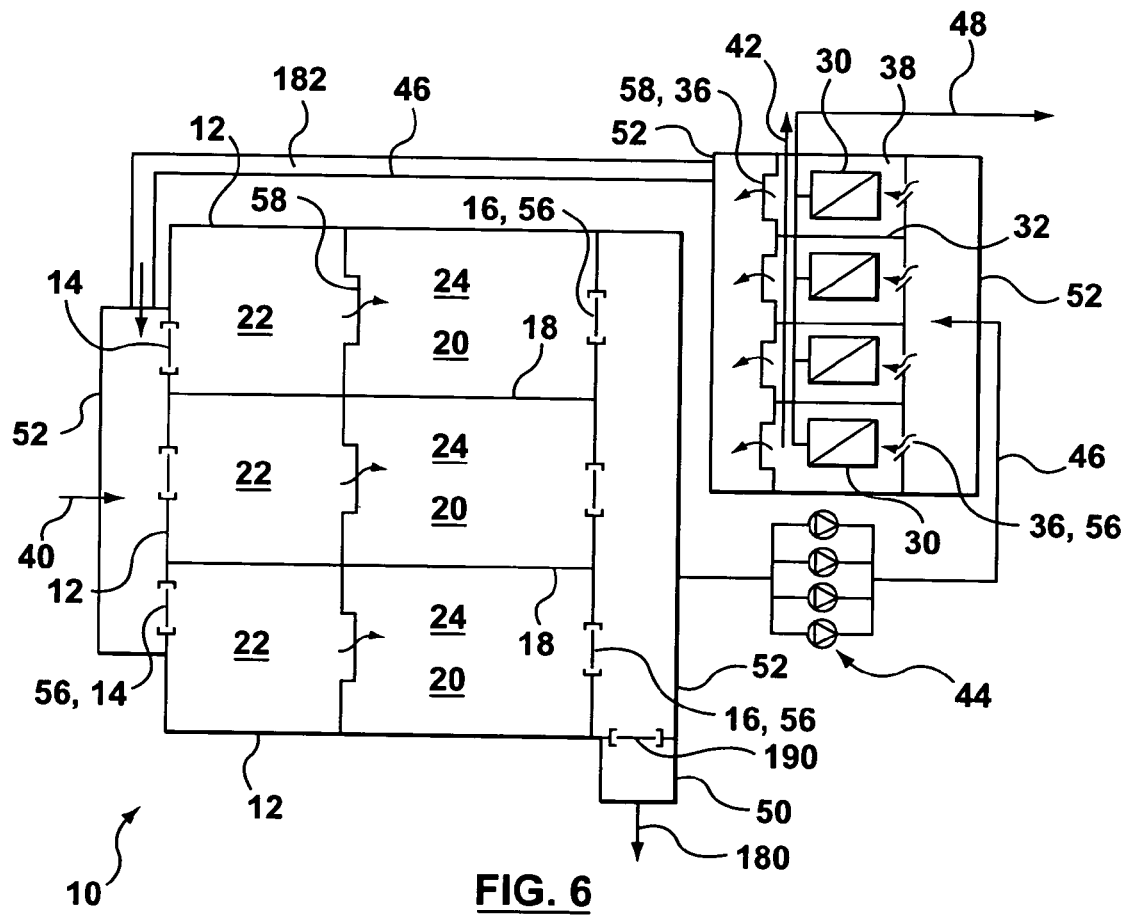
FIG. 6 is a plan view schematic of the plant of FIG. 5.

Feed water enters the treatment plants 10 through a feed inlet 40. Waste sludge exits the treatment plants 10 through a sludge drain 42. A circulation pump 44, which may be a group of pumps, circulates mixed liquor through the treatment plants 10. In some places mixed liquor recirculates through recycle conduits 46, which may be an open channel 182 as in the embodiment of FIGS. 5 and 6. The circulation pump 44 may be a set of circulation pumps connected as shown in FIG. 6 with some of the pumps sized together provide the recirculation flow and one provided as a spare. In other places, mixed liquor circulates through channels 52. The channels 52, depending on their location and use, may also be called splitter boxes, wells, sumps or other names but, in general terms, enclose a volume of water or mixed liquor in communication with two or more parts of a treatment plant 10. Passages for mixed liquor flow are provided by a variety of submerged gates 54, surface gates 56 or weirs 58. Where weirs 58 are used at an outlet 16, 36 for multiple tanks 20, 38, the weirs 58 are set to a common elevation. In general, weirs 58 may be replaced with gates or valves of various types connected to control loops that open or close the gate or valve to preserve a generally constant liquid level upstream of the gate or valve similar to what would be provided by a weir, although this will generally be more complicated and may require periodic opening or closure of the gates or valves or other means to collect foam or move it to another part of the plant 10. Permeate is withdrawn through permeate pipes 48 connected to the membrane trains 30. Foam is removed from the treatment plants 10 through foam sumps 50.

The channels 52 connect the inlets 14, 34 or outlets 16, 36 of plural tanks 20, 38 together. By making this connection, the channels 52 allow solids concentrations to be equalized between the tanks 20, 38. The channels 52 also provide a means for flows to be distributed between tanks 20, 38 without requiring control valves and while minimizing unintended variations in liquid levels between the tanks 20, 38. For example, a particular tank 20 or 38 may be isolated from the treatment plant 10 by closing its associated inlet 14 or 34 and outlet 16 or 36. Flow through the channels 52 automatically changes to distribute the normal flow through the isolated tank 20 or 38 to the other tank 20 or 38. The channels also enhance layout flexibility of the plants 10 by allowing membrane tanks 38 to be in positions other than directly behind any particular process tank 20 and by allowing the number of membrane tanks 38 to be chosen independently of the number of process tanks 20. In the embodiment of FIGS. 5 and 6, the membrane tanks 38 may also be located away from the process tanks 20, if desired. Alternately, the membrane tanks 38 may be located adjacent to the process tanks 20 or rotated, for example by 90 degrees or 180 degrees, to better fit an available space.

Figure 2:
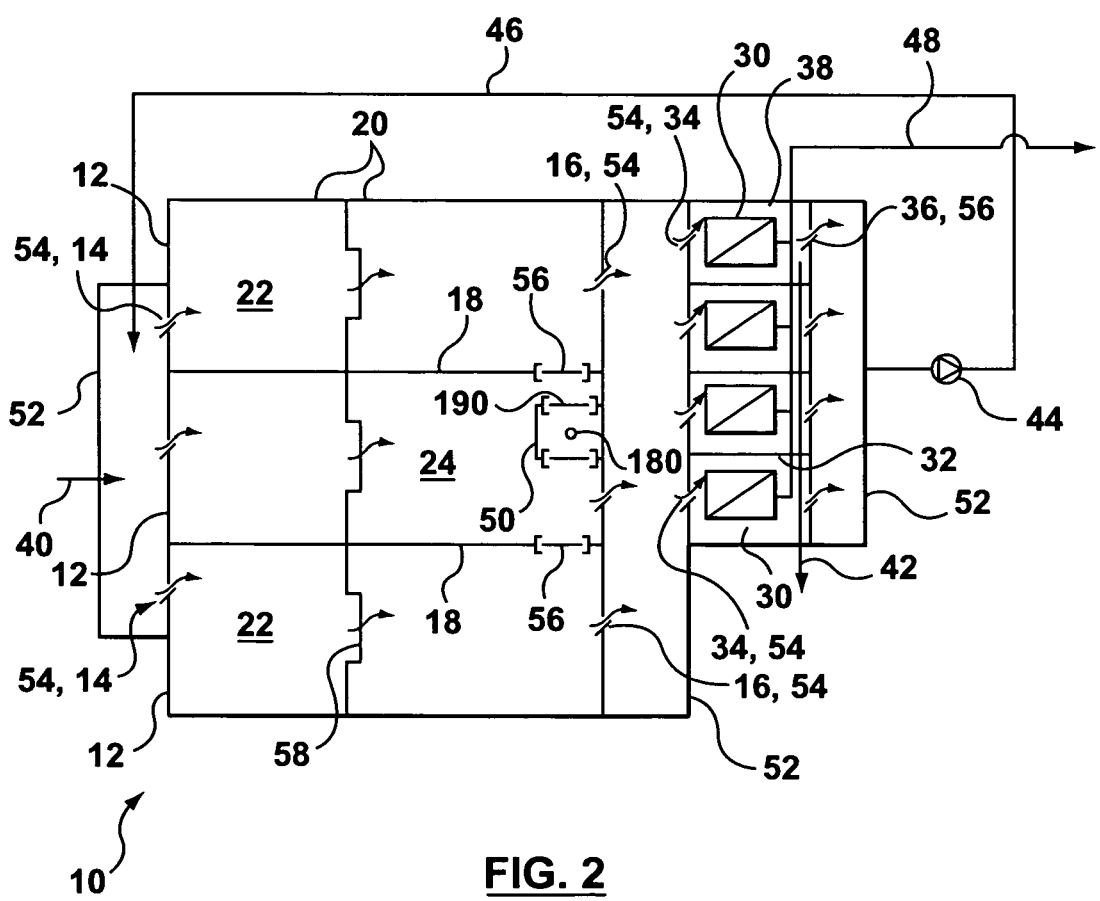
FIG. 2 is a plan view schematic of the plant of FIG. 1.
Figure 3:
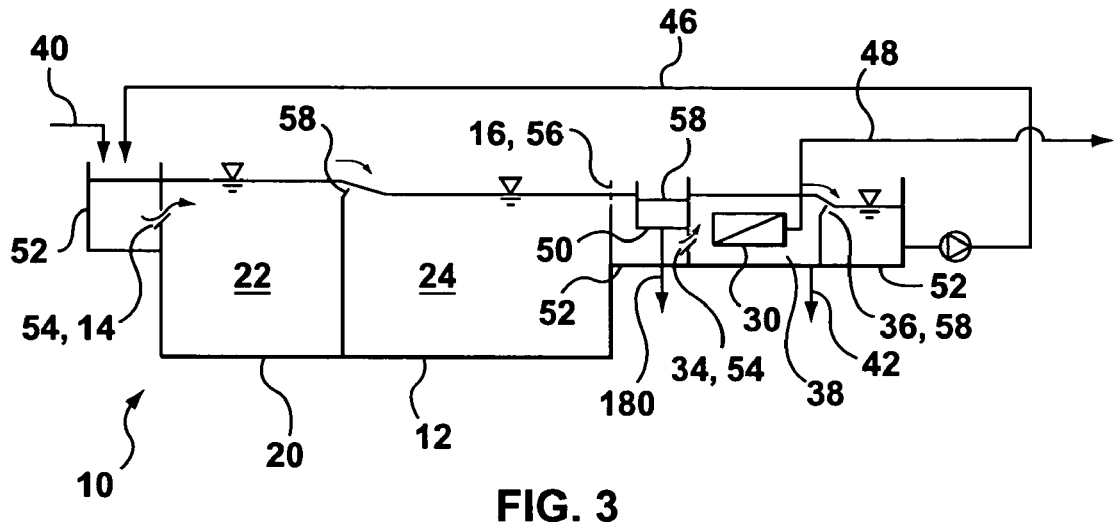
FIG. 3 is an elevation view schematic of another treatment plant.
Figure 4:
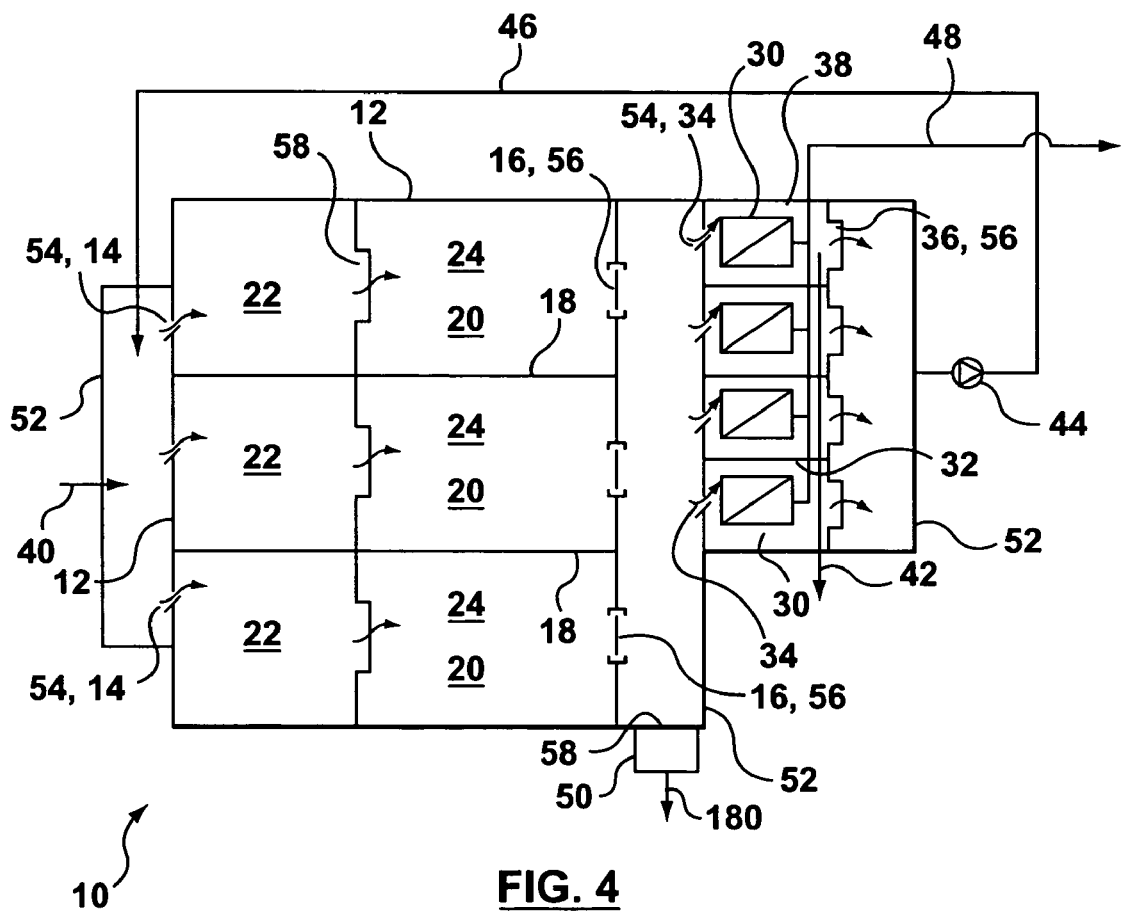
FIG. 4 is a plan view schematic of the plant of FIG. 3.

The channels 52 also allow a number of recirculation pumps 44 to be chosen that is independent of the number of tanks 20, 38 and a single back up or spare recirculation pump 44 may be used for the entire plant 10. The channels 52, in combination with weirs 58 at the membrane tank outlets 36 in some embodiments, also promote a common liquid surface height over the membrane trains 30. The common liquid surface height, among other things, promotes an even supply of aeration to membrane trains 30 connected to a common air supply pipe by minimizing variations in liquid head against the aerators. The channels 52 provide area to help reduce variations in the depth of mixed liquor in those parts of the plant 10 intended to vary in depth. In the embodiment of FIGS. 3 and 4 in particular, the large channel 52 upstream of the recirculation pump 44 provides the primary location where water level is varied to account for changes in mixed liquor volume in the plant 10 allowing weirs 58 to be used as membrane tank outlets 36. In comparison with the embodiment of FIGS. 1 and 2, this reduces liquid level variations over the membrane trains 30, which makes permeate pump and air blower control less complicated in the embodiment of FIGS. 3 and 4. In embodiments with stable mixed liquor elevations around the membrane trains 30, control of permeate pumps uses liquid level information from sensors in the area with the most variable volume of mixed liquor, this being the last channel 52 upstream of the recirculation pump 44 in the embodiment of FIGS. 3 and 4, and the last channel 52 upstream of the circulation pump 44 or an aerobic zone 24 in the embodiment of FIGS. 5 and 6. In the embodiment of FIGS. 1 and 2, level sensors in the membrane tanks 38 or an adjacent channel 52 may be used to control the rate of permeation or aeration.

The embodiments of FIGS. 1-6 include means for controlling or removing foam from the surface of some or all of the various tanks 20,38 and channels 52. In the embodiment of FIGS. 1 and 2, foam in the anoxic zones 22 overflows weirs 58 onto the aerobic zones 24 of each processing tank 20. A foam sump 50 in one of the processing tanks 20 has a foam gate 190, which operates like a controllable variable height weir. The foam gate 190 is a variable height surface gate with servos for raising or lowering the gate. The servos are connected to a level sensor in the aerobic zone 24 surrounding the foam sump 50 or in another part of the plant 10 having a generally similar liquid level. The foam gate 190 is controlled to be raised or lowered in response to liquid level changes to keep the top of the gate just below the surface of the adjacent fluid. At this height foam overflows the foam gate 190 without there being excessive flow of mixed liquid over the foam gate 190. Foam in the foam sump 50 is removed through a foam drain 180. A foam sump 50 may be provided in each processing train 12 and any other location where foam removal is required. To reduce the number of foam sumps 50, however, the embodiment of FIGS. 1 and 2 uses surface gates 56 between adjacent aerobic zones 24 to transfer foam between processing trans 12. The foam transfer is done periodically by opening the surface gates 56 and stopping aeration in the aerobic zone 24 having the foam sump 50. Stopping aeration allows the foam to dissipate around the foam sump 50 so that foam from the adjacent processing trains 12 may migrate through the surface gates 56. After the foam has migrated, surface gates 56 are closed and aeration restarted in the aerobic zone 24 around the foam sump 50. If surface gates 56 are not provided between adjacent processing trains 12, foam can be migrated to the foam sump 50 by temporarily closing the processing train outlets 16 of the adjacent processing trans 12 to cause foam to overflow the processing partitions 18. Stopping aeration in the aerobic zone 24 around the foam sump 50 may assist in the foam transfer. Similarly, foam can be transferred from an upstream zone of a processing train 12 to a downstream zone of the same processing train even if the zones are connected by a submerged gate 54 by temporarily closing the submerged gate 54 until the upstream liquid level rises to the point where foam overflows to the downstream zone.

In FIGS. 3 and 4, foam in the processing trains 12 freely migrates over the weir 58 between the anoxic zones 22 and aerobic zones 24. From the aerobic zones 24, foam freely migrates through the surface gates 56 of the processing train outlets 16 to the channel 52 downstream of the processing trains 12. Foam in this channel 52 flows to a foam sump 50 at one end of the channel. Foam flows into the foam sump 50 over a weir 58 and out through the foam drain 180. In this way, the channel 52 operates to consolidate the foam for all processing trains 12 to one location. The liquid level in the channel 52 with the foam sump 50 is generally constant because it is moderated by the weir 58 at the membrane tank outlets 36. Accordingly, a control loop linked to a level sensor is not required to constantly vary the height of the weir 58 to the foam sump 50. However, the weir 58 may be controllable, for example to allow it to be adjusted to increase or decrease the rate of foam removal or close completely if required for maintenance or other operations in the plant 10. Additional foam sumps 50 may be provided at other locations in the plant 10 as desired.

In the embodiment of FIGS. 5 and 6, a foam sump 50 is provided in the channel 52 downstream of the processing trains. As in the embodiment of FIGS. 3 and 4, foam in all of the processing trains 12 migrates to this single foam sump 50. However, since the liquid level in the channel 52 upstream of the foam sump 50 is variable in this embodiment, a foam gate 190 is provided and connected to a control loop. The control loop includes a level sensor in the adjacent channel 52 or to another part of the plant 10 having a similar liquid level. The foam gate 190 is raised or lowered as required to allow foam to overflow into the foam sump 50 without excessive loss of mixed liquors. Since the inlet to recycle conduit 46 is below the surface of the channel 52 adjacent the foam sump 50, foam is not carried to the channel 52 upstream of the membrane tanks 38. Accordingly, this channel 52 remains generally free of foam. Additional foam is created, however, in the membrane tanks 38. This foam flows over the foam gate 190 of the membrane tank outlets 36 into a downstream channel 52. A second foam sump 50 may be provided at one end of this channel 52 to collect foam created in the membrane tanks 38. Alternately, the recycle conduit 46 between the channel 52 downstream of the membrane tanks 38 may be an open channel 182, for example, an open trough of rectangular cross section. The open channel 182 allows foam to flow, continuously or intermittently, from the channel 52 downstream of the membrane tanks 38 to the channel 52 upstream of the processing trains 12. Foam in this channel 52 flows through the surface gates 56 of processing train inlets 14 to the processing trains 12. As discussed above, foam in the processing trains collects in the foam sump 50 in the channel 52 downstream of the processing trains 12. In this way, all foam in the plant 12 migrates to a single foam sump 50. If submerged gates 54 are provided in some locations in place of weirs 58 or surface gates 56, foam may be made to circulate through the plant 10 as described above by periodically closing the submerged gates 54 to overflow foam to a downstream area of the plant 10.

FIG. 7 to 10 show details of the membrane trains 30 and equipment attached to the membrane trains 30. In these figures, the membrane train tanks 38 are shown but details of the membrane tank inlets 34 and membranes tank outlets 36 are omitted in FIGS. 7 to 10 since the membrane tanks 38 shown in FIGS. 7 to 10 could be part of the embodiments of any of FIGS. 1 to 6. The membrane trains 30 are each made up of a number of cassettes 60. Each cassette 60 may in turn hold several membrane modules or elements together into a common frame. The module or element is the smallest distinct unit that has a structure for holding the membranes and a port for connecting the membranes to a source of suction to withdraw permeate. The module or element may have, for example, between 100 and 1000 square feet of membrane surface area although other sizes may also be used. The modules or elements in the cassette 60 are connected to a common permeate port for the entire cassette 60, typically without isolation valves between the cassette permeate port and permeate ports for individual modules or elements. Isolation valves are typically included, however, to permit a single cassette 60 to be separated from pipes connected to other cassettes 60 in a membrane train 30, for example to remove, repair or test a single cassette 60. These valves are typically not used to control many common functions, such as permeation, and so are not shown in FIGS. 7 to 10. However, a large membrane train 30, or a group of cassettes 60 otherwise provided in a single membrane tank 38, may be subdivided into smaller groups or racks for various purposes.

Figure 7:
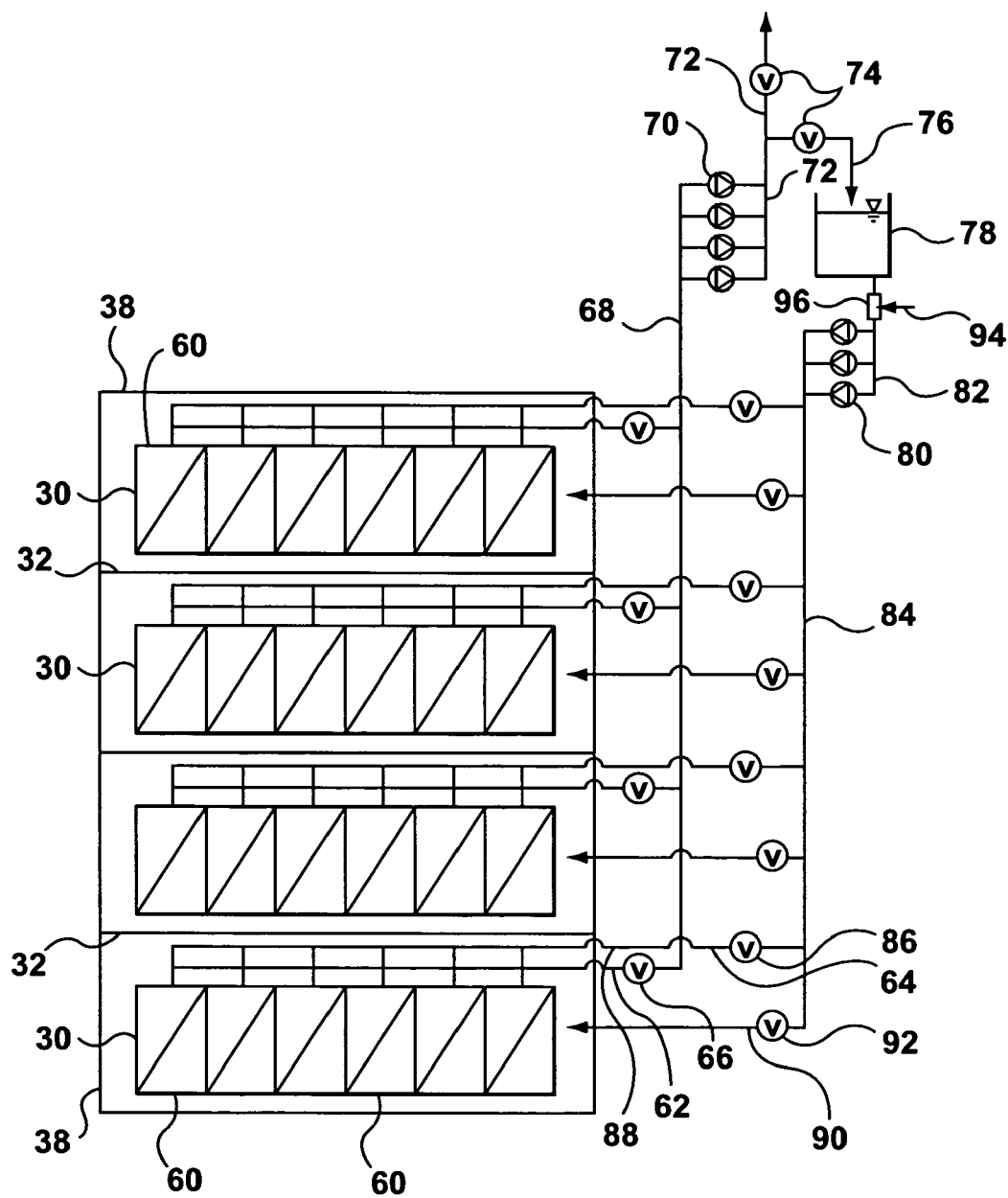
FIG. 7 is a schematic plan view of permeate, backwashing, chemical cleaning and non-permeate tank filling apparatus for a treatment plant.

In FIG. 7, the permeate port of each cassette 60 is attached to a train permeate header 62 and a train backwash header 64. The train permeate header 62 of each membrane train 30 is attached through a permeate valve 66 to a plant permeate header 68. The plant permeate header 68 is in turn connected to a set of plural permeate pumps 70 each connected by their inlets to the plant permeate header 68 and by their outlets to a permeate outlet pipe 72. One of the permeate pumps 70 may be operated as a spare to be used if one of the other permeate pumps 70 breaks. Accordingly, in the embodiment illustrated, the three non-spare permeate pumps 70 are sized for the maximum flow from the four membrane trains 30. The amount of permeate produced may be controlled by altering the speed of some or all of the non-spare permeate pumps 70, by turning on or off one or more of the non-spare permeate pumps 70 or closing or opening one or more of the permeate valves 66, or by a combination of these techniques. The permeate production of an individual membrane train 30 may be controlled by using flow control valves for the permeate valves 66 and operating the permeate valve 66 of one or more membranes trains 30 to restrict flow of permeate relative to another membrane train 30. By operating permeate diversion valves 74, permeate outlet pipe 72 may be connected to a backwash tank inlet 76 to fill a backwash tank 78. Diversion valves 74 may be connected to a level sensor in backwash tank 78 and automatically controlled to divert permeate as required to keep backwash tank 78 filled above a set minimum volume and below a set maximum volume.

To backwash the cassettes 60, a set of backwash pumps 80, one of which may be operated as a spare, are connected between a backwash tank outlet pipe 82 and a plant backwash manifold 84. The plant backwash manifold 84 is connected through backwash valves 86 to a train backwash header 88 for each membrane train 30. The train backwash headers 88 are in turn connected to the permeate port of each cassette 60. The plant backwash manifold 84 is also connected to a permeate fill pipe 90 connected through a permeate fill valve 92 associated with each membrane tank 38. Backwashing is typically performed on one membrane train 30, or a smaller set of cassettes 60, at a time by closing the permeate valve 66 associated with the set of cassettes 60, opening the associated backwash valves 86, and operating backwash pumps 80 which may cause diversion valves 74 to divert permeate to backwash tank 78. The number and size of backwash pumps 80 may be chosen for a single membrane train 30, or smaller set of cassettes 60, although backwash pumps 80 service all cassettes 60 in the plant 10.

For maintenance cleaning, or other times when a backwash with a chemical solution is desired, chemicals may be introduced into the permeate used for backwashing through a chemical inlet 94 to an in-line mixer 96 in the backwash tank outlet pipe 82 or another location in the backwash piping. During maintenance cleaning, or at other times when a chemical backwash will be supplied to cassettes 60 in one membrane tank 38, that tank may be isolated from the rest of the plant 10 by closing all associated permeate valves 60, and the associated membrane tank inlet 34 and membrane tank outlet 36, although the isolated membrane tank 38 may remain filled. The backwash with cleaning chemicals may be performed in a series of short periods of flow, for example of between 30 seconds and 5 minutes, separated by waiting periods of, for example, 1 minute to 20 minutes. For recovery cleaning, or at other times when an empty membrane tank 38 is desired, an isolated membrane tank 38 may be drained using the apparatus described in relation to FIG. 10 below. The recovery cleaning regimen may involve backwashing a set of cassettes 60 with permeate mixed with cleaning chemical, as described for maintenance cleaning but with the membrane tank 38 initially empty, until the membrane tank 38 is partially filled. The membrane tank 38 may then be filled to cover the cassettes 60 through permeate fill pipes 90 which may have more cleaning chemical mixed into it. The cassettes 60 are then allowed to soak for an extended period of time, for example between 15 minutes and 6 hours. The isolated membrane tank 38 is then drained and returned to service. The liquid drained out of the isolated membrane tank 38 may be wasted, returned to a channel 52 upstream of the processing tanks 20, or distributed to other membrane tanks 38 or sent for other treatment.

Figure 8:
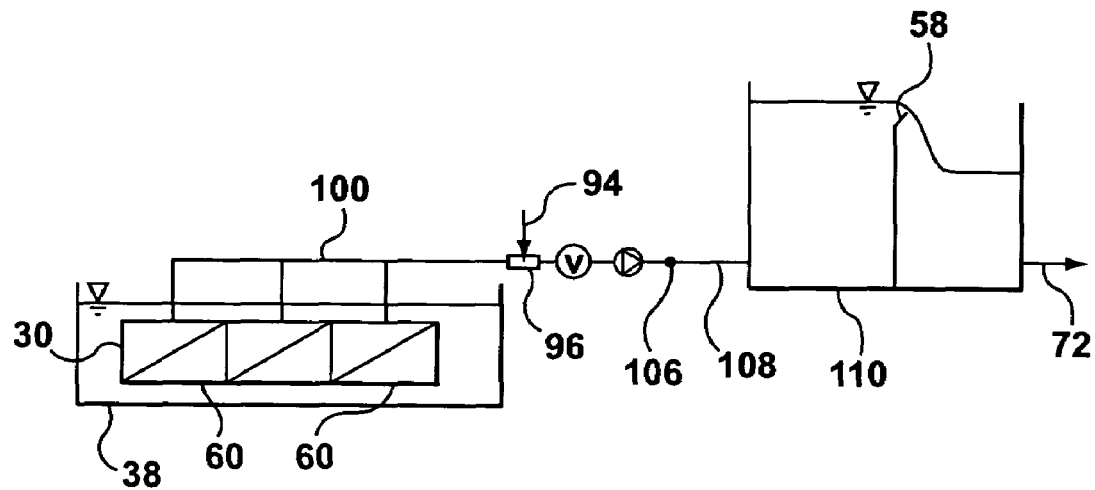
FIG. 8 is a plan view schematic of permeate, backwashing, chemical cleaning and non-permeate tank filling apparatus for another treatment plant.
Figure 9:
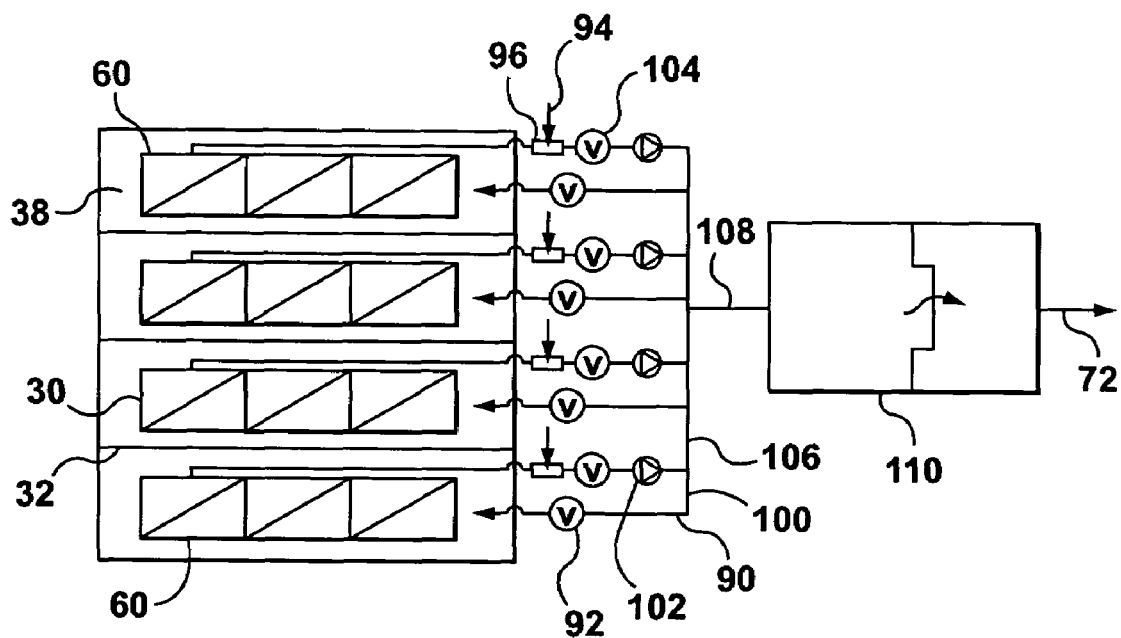
FIG. 9 is an elevation view schematic of the apparatus of FIG. 8.

FIGS. 8 and 9 show an alternate means of providing permeation and backwashing. The cassettes 60 of each membrane train 30 are connected to a permeate/backwash header 100 having an in-line reversible pump 102 and flow control valve 104, although the flow control valve 104 may be replaced by a simple valve if a variable speed reversible pump 102 is used. The permeate/backwash headers 100 are connected to a plant permeate/backwash header 106 connected to a holding tank inlet 108 leading to a holding tank 110. The holding tank 110 is configured to fill itself to a maximum volume before releasing permeate to a permeate outlet pipe 72. In the embodiment illustrated, this configuration is achieved through the use of a weir 58, although the weir 58 may be omitted if permeate outlet pipe 72 is connected to a point near the top of holding tank 110. Alternately, as in other locations in the plant 10 where a weir 58 is used, a submerged gate 54 or surface gate 56 may be used in place of a weir 58 if linked to a level sensor and control device to control flow out of the retaining tank 110 so as to keep the level of liquid in the holding tank 110 within a suitable range. In all cases described above, the volume of the plant permeate/backwash header 106 and holding tank inlet 108 may be made large and considered as part of the holding tank volume 110 to reduce the size of holding tank 110 and retain a larger volume of permeate closer to the cassettes 60.

To produce permeate, reversible pumps 102 are operated in a forward direction to flow permeate to the retaining tank 110. Retaining tank 110 is kept above a minimum level or pressure so that plant permeate/backwash header 106 is always full of permeate. To backwash a selected set of cassettes, the reversible pump 102 associated with that set of cassettes is reversed so that it draws permeate from plant permeate/backwash header 106 and flows the permeate back through the set of cassettes. Depending on the size of plant permeate/backwash header 106 and the rate of flow of permeate from non-selected cassettes, permeate may or may not also be drawn from retaining tank 110. With a very large plant permeate/backwash header 106 and adequate control mechanisms to ensure that plant permeate/backwash header 106 is always flooded, retaining tank 110 may be omitted. Alternately, retaining tank 110 may be configured as a channel 52 directly connected to permeate/backwash headers 100 and plant permeate/backwash header 106 and holding tank inlet 108 omitted. Chemical inlets 94 and in-line mixers 96 are provided in the embodiment of FIGS. 8 and 9 and used in a manner similar to that described for the embodiment of FIG. 7 to provide maintenance cleaning or recovery cleaning to an isolated membrane tank 38. Permeate fill pipes 90 and permeate fill valves 92 are also provided to allow a selected membrane tank 38 to be filled with permeate. Permeate fill pipes 90 may alternately be connected directly to holding tank 110, to a channel 52 replacing holding tank 110, to permeate/backwash headers 100 if the reversible pumps 102 are flow through pumps or if permeate/backwash headers have a by-pass loop around the reversible pumps 102. In the option last mentioned above, the permeate fill pipes 90 may optionally be connected to the permeate/backwash headers 100 between the cassettes 60 and the in-line mixers 96 to allow chemicals to be mixed with permeate used to fill a membrane tank 38 if desired.

Figure 10:
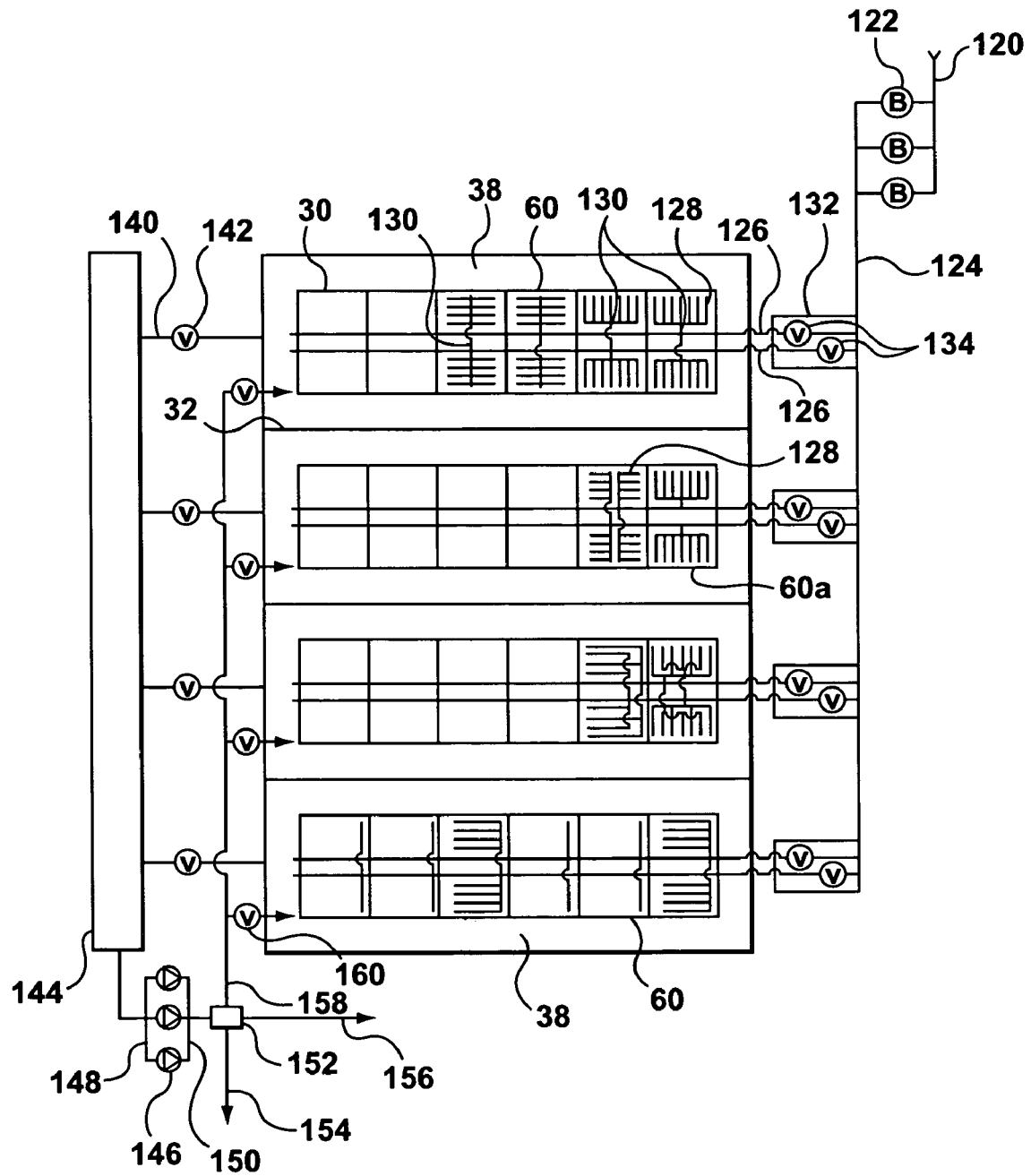
FIG. 10 is a plan view schematic of aeration, tank draining and sludge circulation apparatus of a treatment plant.

FIG. 10 shows a means for aerating the cassettes 60. An air inlet 120 draws air from the atmosphere generally into the plant 10. A set of blowers 122 each have their inlets connected to the air inlet and their outlets each connected to a plant air manifold 124. The number and size of blowers 122 is chosen to supply air to all cassettes 60, optionally with one or more blowers 122 operating as a spare. The plant air manifold 124 is connected to a pair of train air manifolds 126 associated with each membrane train 30. The train air manifolds 126 are connected to individual aerators 128, typically through one or more intermediate pipes 130 that connect individual aerators 128 to one of a pair of common air inlets. Each air inlet is connected to one of the train air manifolds 126. The aerators 128 are located so as to provide a source for bubbles that rise through the cassettes 60 and may be connected to the frame of the cassette 60, wholly or partially integral with the modules or elements, or free standing on the floor of the membrane tanks 38.

The connection between the plant air manifold 124 and the train air manifolds 126 is made through cyclic valve sets 132. The cyclic valve sets 132, with their associated controllers, may be operated to provide a higher rate of air flow in one of the train air manifolds 126 of a pair and a lower rate of air flow, ranging from no flow to one half of the higher rate of air flow, in the other of the train air manifolds 126 of a pair, and to switch which train air manifold 126 of a pair receives the higher air flow in repeated cycles, typically between 15 seconds and 120 seconds in duration. Suitable cyclic valve sets 132 and controllers are described in U.S. Pat. No. 6,550,747 issued Apr. 22, 2003 to Rabie et al and incorporated herein in its entirety by this reference to it. The cyclic valve sets 132 may also be operated to shut off flow to both train air manifolds 126 of a pair simultaneously to allow a membrane train 30 to be isolated from air flow, or separate isolation valves may be provided for the same purpose. When flow to a membrane train 30 is shut off, the speed of the blowers 122 may be reduced or one or more of the blowers 122 may be shut off, or both, to avoid supplying the non-isolated membrane trains 30 with an excess of air. Valve opening and closing times may be staggered across the cyclic valve sets 132 to reduce pressure spikes in the plant air manifold 124. For example, where each cyclic valve set 132 includes two air valves 134 as in the embodiment shown, one valve 34 of each cyclic valve set may open for about 10 seconds and close for about ten seconds to produce a 20 second cycle, but the opening times of all eight air valves 34 is staggered such that one air valve 134 begins opening and one air valve 134 begins closing about every 2.5 seconds, optionally as adjusted to provide an overlap in the opening and closing of air valves 134 in a cyclic valves set 132 as described in U.S. Pat. No. 6,550,747.

FIG. 10 also shows a means for draining individual membrane tanks 38. In addition to the membrane tank outlets 36, each membrane tank 38 also has a tank drain line 140 running from the near the bottom of the membrane tank 38 through a drain valve 142 to a drainage channel 144. Tank drain lines 140 may be deleted by placing drainage channel 144 directly adjacent to ends of the membrane tanks 38, optionally such that the drainage channel 144 shares a wall with the membrane tanks 38. In this case, a channel 52 for recirculating flows of mixed liquor on one end of the membrane tanks 38 may be made shallower and located above the drainage channel 144. If desired, drainage channel 144 may be replaced by a more remote drainage tank or omitted, although omitting the drainage channel 144 without providing a drainage tank will complicate drainage control. A set of drainage pumps 146, one of which may be a spare, are connected by their inlets to drainage manifold 148, which may be connected directly to the drainage channel 144 or directly to the tank drain lines 140. The outlets of the drainage pumps 146 are connected to a drainage header 150 that is connected to a drainage junction box 152. From drainage junction box 152, drained liquids may be sent through a digester line 154 to a digester or other type of sludge processor, to a sludge recirculation line 156 to be inlet back into the plant 10 at another location, or to a re-fill line 158 from where, by selectively opening or closing one or more re-fill valves 160, the drained fluids may be flowed into one or more of the membrane tanks 38. Each membrane tank 38 may be drained individually by closing its associated membrane tank inlet 34 and membrane tank outlet 36 and opening its associated drain valve 142. Sludge may be also be wasted from one or more membrane tanks 38, either individually or some or all at a time, and either in batch or continuously, by operating the relevant drain valves 142. Drainage pumps 146 are operated as required to keep the level of sludge in drainage channel 144 within acceptable limits or to meet demand for sludge in other parts of the plant 10.

The apparatus in FIG. 10 may also be used to thicken sludge at times when all membrane trains 38 are not required at their maximum permeate production capacity. To thicken sludge in a selected membrane tank 38, drain valves 142 from the non-selected membrane tanks 38 are partially opened to admit sludge into the drainage channel 144. Filtration and mixed liquor recirculation may continue in the non-selected membrane tanks 38. The drain valve 142 and membrane tank outlet 36 to the selected membrane tank 38 are closed. Permeation continues through the cassettes 60 in the selected membrane tank 38. Liquid removed from the selected membrane tank 38 through permeation is replaced by mixed liquor flowing in through the membrane tank inlet 34, sludge for the non-selected membrane tanks 38 pumped from the drainage channel 144 through the re-fill line 158 to the selected membrane tank 38 or a mix of both. Liquid replacement may be continuous or in batches, but with the liquid level in the selected membrane tank 38 kept above the cassettes 60. When the concentration of solids in the selected membrane tank has increased to a desired concentration, the concentrated sludge is drained from the selected membrane tank 38. This is done by closing the drain valves 142 to the non-selected membrane tanks 38 while opening the drain valve 142 to the selected membrane tank 38. Thickened sludge flows into the drainage channel 144 from where it is pumped to the digester line 154. After the selected membrane tank 38 is drained, drain valves 142 to the non-selected membrane tanks 38 may be re-opened. The selected membrane tank 38 may be used to thicken another batch of sludge or returned to ordinary operation.

A selected membrane tank 38 may also be used to thicken sludge continuously. For this, drain valve 142 to the selected membrane tank 38 is opened while drain valves 142 to the non-selected membrane tanks 38 are closed. Membrane tank inlet 34 to the selected membrane 38 tank is closed while membrane tank inlets 34 to the non-selected membrane tank 38 are opened. Membrane tank outlets 36 to all membrane tanks 38 are opened. If the membrane tank outlet 36 to the selected membrane tank 38 is a weir 58 or surface gate 56, it is lowered, if necessary, so that liquid in a channel 52 downstream of the membrane tanks 38 may flow into the selected membrane tank 38. In this way, a portion of liquid from the membrane tank outlets 36 of the non-selected membrane tanks 38 flows to the selected membrane tank 38 for further thickening. Thickened sludge is extracted from the selected membrane tank 38 through the draining channel 144. In either batch or continuous operation, the cassettes 60 in the selected membrane tank 38 may be aerated more heavily or have a lower rate of permeation than other cassettes 60.

Numerous other modifications may also be made within the scope of the invention.

We claim:
1. A wastewater treatment plant having,
   (a) two or more membrane tanks, each membrane tank having an inlet and a mixed liquor outlet;
   (b) a train of cassettes of membrane modules located in each membrane tank, the membrane modules each having a feed side in communication with the inlet and the mixed liquor outlet, and a permeate side in communication with a permeate outlet port and a source of suction; and,
   (c) a recycle conduit in communication with the mixed liquor outlet of each membrane tank and a region upstream of the membrane tank inlets,
   wherein each train has a train permeate header in communication with the permeate outlet port of each module, and the train headers are attached to a common plant permeate header which is in turn connected to a plurality of parallel permeate pumps downstream of the common plant permeate header, the plurality of parallel permeate pumps connected by their inlets to the plant permeate header and by their outlets to a common permeate pipe, wherein each train header has an isolation valve and each permeate pump may be separately turned on or off; and
   wherein permeate may be diverted from the common permeate pipe to a backwash circuit, the backwash circuit comprising a backwash tank in communication with the common permeate pipe, at least one backwash pump downstream of the backwash tank, and a backwash manifold downstream of the backwash pump and in communication with a train backwash header of each module.

2. The wastewater treatment plant of claim 1 wherein the mixed liquor outlets of the membrane tanks comprise weirs or controlled weirs, gates or valves adapted to maintain a generally common liquid level in the membrane tanks.

3. A wastewater treatment plant having,
   (a) two or more membrane tanks, each membrane tank having an inlet and a mixed liquor outlet;
   (b) a train of cassettes of membrane modules located in each membrane tank, the membrane modules each having a feed side in communication with the inlet and the mixed liquor outlet, and a permeate side in communication with a permeate outlet port and a source of suction; and,
   (c) a recycle conduit in communication with the mixed liquor outlet of each membrane tank and a region upstream of the membrane tank inlets,
   wherein each train has a train permeate header in communication with the permeate outlet port of each module, the train permeate headers are attached to common plant permeate pipe and the plant permeate pipe is connected to a container adapted to maintain a supply of permeate in the common plant permeate pipe, and a reversible pump in line with each train permeate header between the outlet ports of the modules and the plant permeate pipe, the reversible pump adapted to selectively withdraw permeate from the train or backwash the train.

4. A wastewater treatment plant having,
   (a) two or more membrane tanks, each membrane tank having an inlet and a mixed liquor outlet;
   (b) a train of cassettes of membrane modules located in each membrane tank, the membrane modules each having a feed side in communication with the inlet and the mixed liquor outlet, and a permeate side in communication with a permeate outlet port and a source of suction;

(c) a recycle conduit in communication with the mixed liquor outlet of each membrane tank and a region upstream of the membrane tank inlets; and, (d) a second outlet of each membrane tank is in communication with a common tank drain pipe or channel usable to drain each membrane tank, wherein an outlet of the common tank drain pipe channel may be placed in communication with a fill line to one or more of the membrane tanks, wherein the fill line is separate from the recycle conduit.

5. The plant of claim 4 having means of fluid communication and control configurable to allow temporary operation of a membrane train for sludge thickening while another membrane train operates in normal production.

* * * * *